United States Patent [19]
Kobayashi et al.

[11] 3,761,807
[45] Sept. 25, 1973

[54] APPARATUS FOR CONSTRUCTING POTENTIAL GRADIENT

[75] Inventors: Takao Kobayashi; Tadahiko Sasaki, both of Tokyo, Japan

[73] Assignee: Iwatsu Electric Co., Ltd., Tokyo, Japan

[22] Filed: Aug. 20, 1971

[21] Appl. No.: 173,427

[52] U.S. Cl. .................................................. 324/72
[51] Int. Cl. ............................................ G01r 29/14
[58] Field of Search .................. 324/72, 64, 29, 32; 178/18, 20; 235/61.6 B

[56] References Cited
OTHER PUBLICATIONS

Mickelsen, J. K.; General Electric Rev.; November 1949; pgs. 19 to 23.

Green, Jr.; Review of Sci. Instrum.; Vol. 19; No. 10; October 1948; pages 646–653.

Primary Examiner—Rudolph V. Rolinec
Assistant Examiner—Ernest F. Karlsen
Attorney—Woodcock, Washburn, Kurtz & Mackiewicz

[57] ABSTRACT

Apparatus constructing the potential gradient of a potential distribution on conductive paper or the like as measured by a plurality of linearly arranged probes. The probes are scanned so as to selectively apply the voltage between different probes to one input of an X–Y recorder while a synchronized voltage indicating the position of the probes being scanned is applied to another input of the X–Y recorder.

5 Claims, 14 Drawing Figures

3,761,807

APPARATUS FOR CONSTRUCTING POTENTIAL GRADIENT

FIELD OF THE INVENTION

This invention relates to an apparatus for constructing a potential gradient and more particularly to automatically constructing the potential gradient of a potential distribution.

In order to imitate various phenomena and analyze the phenomena a kind of analysis is utilized for example in which a conductive paper (hereafter termed anacon-paper) that has been turned conductive after being uniformly coated with carbon on a ground paper is used and on this anacon-paper a desired shape of electrode is provided and on this electrode a predetermined voltage is given whereby the potential distribution appearing on the anacon-paper is examined.

Hitherto, when one wants to know the potential distribution on the anacon-paper, it was the practice that the operator puts two probes keeping a proper distance between them on the anacon-paper and reads potential difference detected by the probes on a digital voltmeter and plots the said potential difference on the graph paper. The method of tracing the potential distribution in this way is extremely complicated and inaccurate.

SUMMARY AND OBJECTS OF THE INVENTION

An object of this invention is to provide an apparatus for automatically constructing a potential gradient.

Another object of this invention is to provide an apparatus for constructing a potential gradient in an extremely short time.

Further object of this invention is to provide an apparatus for constructing a potential gradient extremely accurately.

According to the present invention, apparatus for constructing potential gradient comprises a potential detector having a plurality of, preferably many, voltage probes, a scanning circuit scanning in order the output of said potential detector and applying said output to a construction means, a position-responding voltage generator generating voltage responding to the position of said voltage probes and applying said voltage to said construction means, and said construction means constructing the relation between the potential and distance on an optional line segment of an object of measurement by the two signals from said scanning circuit and said position-responding voltage generator whereby the potential gradient of potential distribution on said line segment can be constructed by means of said construction means.

The invention will now be described, by way of example, with reference to the accompanying drawings.

DESCRIPTION OF THE PREFERRED EMBODIMENTS

Figure 1:
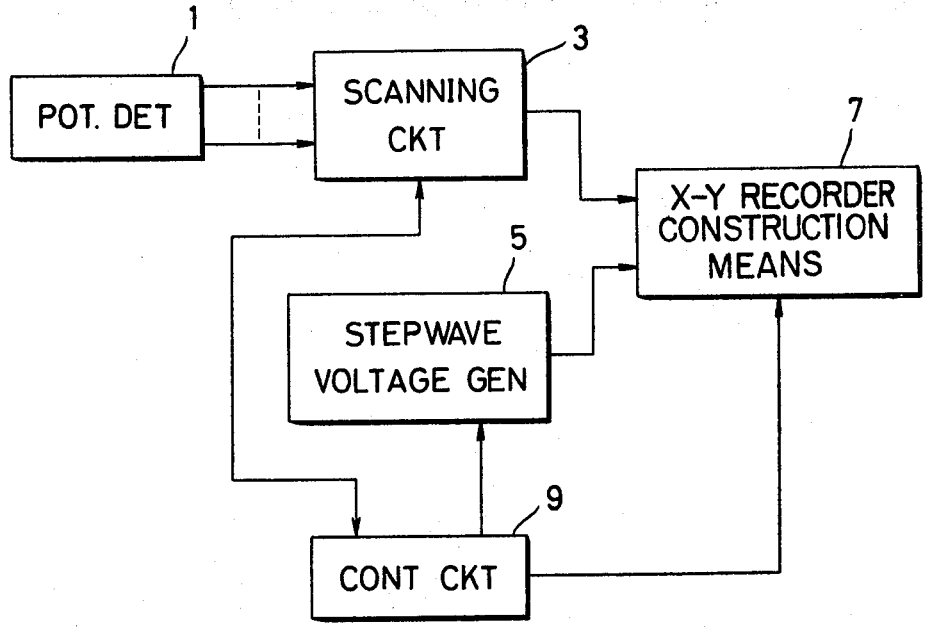
FIG. 1 is a block diagram of one embodiment of an apparatus for constructing potential gradient in accordance with this invention.
Figure 2:
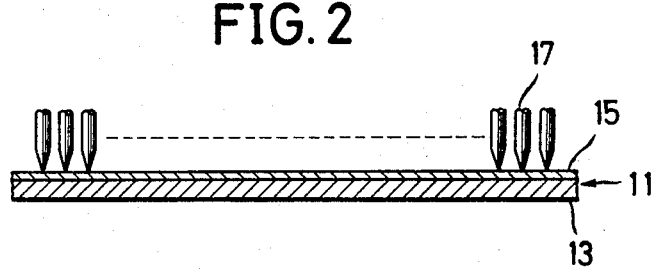
FIG. 2 is a sectional view of one embodiment of mechanism indicating relation between an anacon-paper and probes in accordance with this invention.
Figure 3:
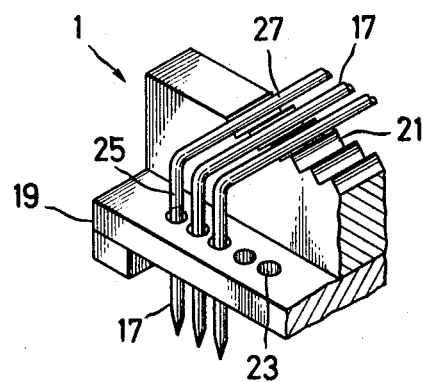
FIG. 3 is a perspective view, partially cut-off, of one embodiment of a potential detector shown in FIG. 1 in accordance with this invention.
Figure 4:
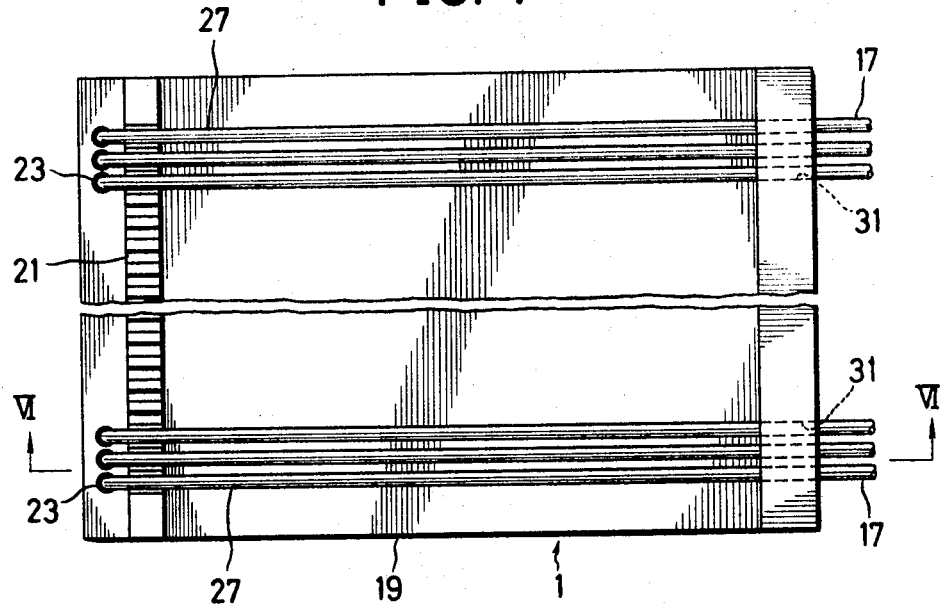
FIG. 4 is a plan view, partially cut-off, of the potential detector shown in FIG. 3.
Figure 5:
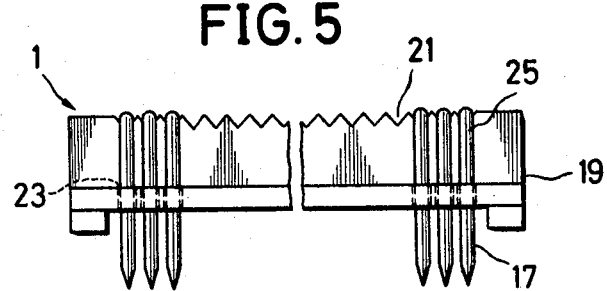
FIG. 5 is a front view, partially cut-off, of the potential detector shown in FIGS. 3–4.
Figure 6:
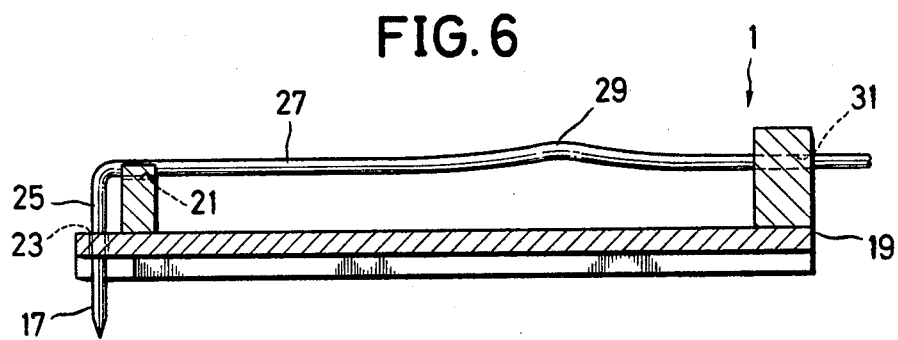
FIG. 6 is a sectional view taken along the line VI — VI of FIG. 4.

In FIG. 1 is illustrated an apparatus for constructing potential gradient comprising a potential detector 1, a scanning circuit 3, a step-wave voltage generator 5, construction means 7 and a control circuit 9.

In FIGS. 2–6 is shown one embodiment of the potential detector 1. The potential detector 1 is provided with a plurality of probes 17 and is formed in a way that the probes 17 lay on an anacon-paper 11 made up by coating carbon 15 on an insulating ground paper 13. In this embodiment, the probes 17 are made up by nickel silver of 0.45 mm with the end tips sharpened to a diameter of 40 – 60 $\mu$. In this embodiment, nickel silver is employed as the probes 17 but phosphor bronz or tungusten is also suitable for the material of the probes. The probes 17 fixed on holes 31 of an adapter plate 19 made up by delrin (trademark of polyacetal). The probes take the form of L and have a horizontal portion 27 of about 42 mm and a vertical portion 25 of about 15 mm. On the horizontal portion 27 of the probe 17 is a curved portion 29 which is formed to incline about 12 degrees against horizontal in a state that the end tip of the probe does not contact with the anacon-paper 11. The curve portion 29 is also formed to get the vertical portion 25 of the probe 17 almost perpendicular against the anacon-paper 11 in a state that the end tip of the probe 17 contacts with the anacon-paper 11. The point where the curve portion 29 is set up is about 13.5 mm away from the hole 31 of the adapter plate 19, namely divides about 1:2 of the horizontal portion 27.

The probe 17 has spring action by which the probe 17 is formed to contact with the anacon-paper 11 under the contact strength of about 6 – 7 g.

The adapter plate 19 to be fixed with the probes 17 is made up by synthetic resin and is provided with a plurality of holes 31, v-shaped guide grooves 21 and round guide holes 23 respectively. The guide holes are provided in response to the number of probes 17 and the horizontal portions 25 of the probes 17 are inserted in these guide holes. As the material of the adapter plate forming the guide holes 23, teflon (trademark of polyfluoroethylene) is suitable in consideration of a smooth horizontal movement of the probe 17. When transparency is sought, polycarbonate is suitable as the material of the adapter plate. In this embodiment, the diameter of the guide hole 23 is about 0.5 mm and 101 numbers of this guide hole are arranged in line with equal distance of about 1mm. The guide groove 21 is formed to guide the horizontal portion 27 of the probe 17 and 101 numbers of this groove corresponding to the number of the probe 17 are formed.

The adapter plate 19 with which the probe 17 is fixed tends to rise upward due to repulsive force according to spring action of the probe 17. To eliminate this, a weight (not shown) is affixed on the adapter plate 19.

Figure 7:
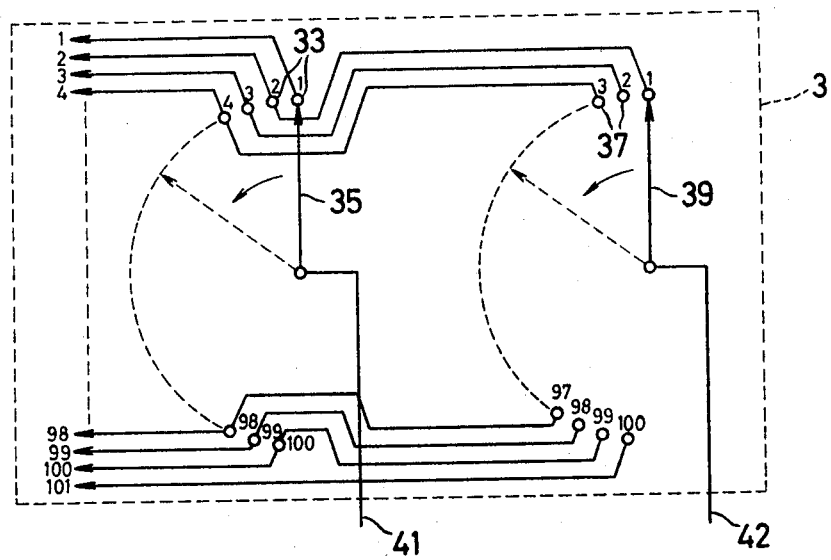
FIG. 7 is a circuit diagram of one embodiment of a scanning circuit shown in FIG. 1 in accordance with this invention.

In FIG. 7 is illustrated a scanning circuit 3 which scans the circuit of plural probes 17 of the potential detector 1 whereby the output of the probe 17 is selectively applied to the construction means 7 on the next step. The scanning circuit 3 is provided with a first scanning means consisting of a 100 fixed contacts 33 and a travelling contact 35 that contacts with these fixed contacts 33 in order, and a second scanning means consisting of 100 fixed contacts 37 and a travelling contact 39 that contacts with these fixed contacts in order.

The first fixed contact 33 in the first scanning means is connected with the first probe 17 of potential detector 1 while the second fixed contact 33 with the second probe 17 respectively and in this way the 100th fixed contact 33 is connected with the 100th probe 17. In the second scanning means, the first fixed contact 37 is connected with the second probe 17 of said potential detector 1 while the second fixed contact 37 with the third probe 17 respectively and, in this way, the 101st probe 17. And, synchronizing with the scanning of the 1st – 100th fixed contacts 33 by the travelling contact 35, the travelling contact 39 is made up to scan the 1st – 100th fixed contacts 37.

The travelling contacts 35,39 rotate in accordance with signals from the control circuit 9.

The travelling contact 35 is connected with wire 41 while the travelling contact 39 with wire 42 respectively and the output from these wires 41 and 42 is applied to the construction means 7 on the next step. Though none is illustarated in drawings, between the wires 41, 42 and to the construction means 7 is connected a low-pass filter circuit consiting of a resistance and a capacitor. The low-pass filter circuit functions to reduce noises and, at the same time to smooth the motion of pen of the X-Y recorder of the construction means 7. Further, though not illustrated in drawings, the scanning circuit 3 is provided with a probe contact detecting means that detects if the probe 17 surely contacts the anacon-paper 11 or not. This detection is done ahead of construction. If there is any probe that doesn't properly contact an anacon paper 11, an alarm will be generated at the control circuit 9 as a detecting signal is applied to the control circuit 9 from the potential detector 1 and then the apparatus will suspend operation. The scanning circuit 3 in this embodiment is constituted by the use of a mechanical switch but an electronic switch is possibly used instead.

Figure 8:
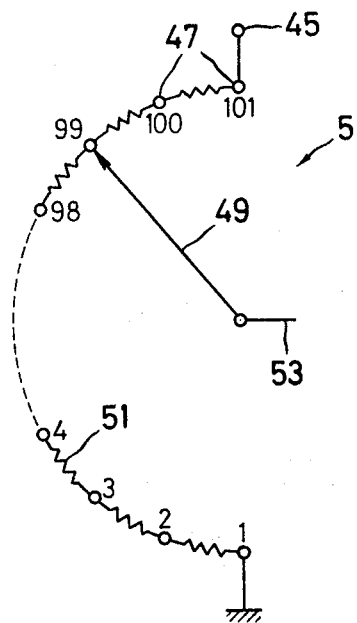
FIG. 8 is a circuit diagram of one embodiment of a voltage generator shown in FIG. 1 in accordance with this invention.
Figure 9:
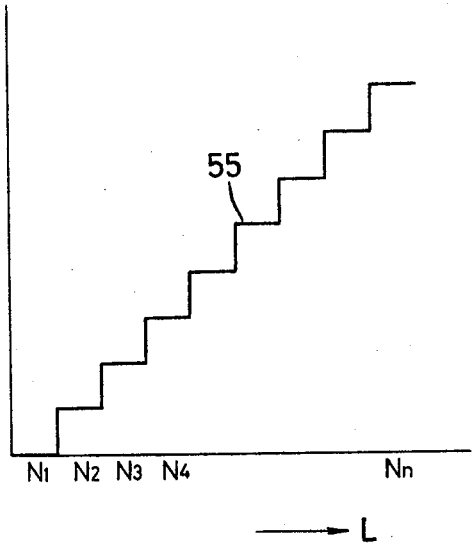
FIG. 9 is an output waveform of the voltage generator shown in FIG. 8.
Figure 13:
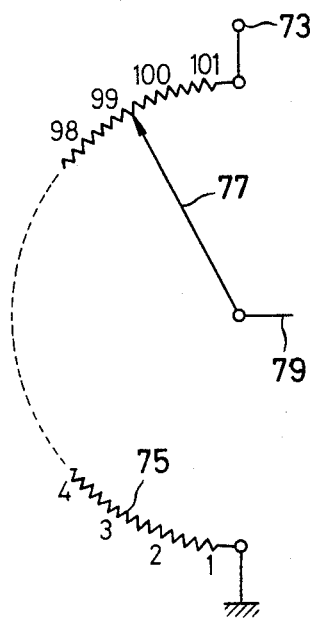
FIG. 13 is a circuit diagram of another embodiment of the generator shown in FIG. 1 in accordance with this invention.
Figure 14:
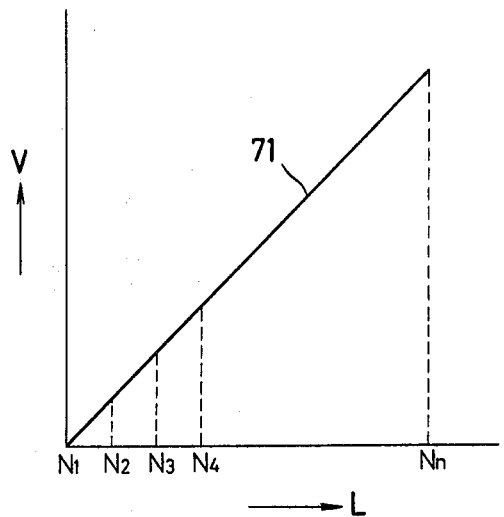
FIG. 14 is an output waveform of the generator shown in FIG. 13.

In FIG. 8 is shown an example of the stepwave voltage generator 5 which is formed so that the travelling contact 49 slides on the 1st – 100th fixed contacts 47 arranged in order and shaped as semi-circle as a whole. Between the respective fixed contacts 47, resistance 51 corresponding to the distance of the probes 17 are connected. The stepwave voltage generator 5 is provided with a terminal 45 to apply the voltage thereon and wire 53 to take out the voltage from the travelling contact 49 respectively. And, the wire 53 is connected with the construction means 7 on the next step. The travelling contact 49 of the stepwave voltage generator 5 is made to operate in a synchronized manner with the travelling contacts 35 and 39 of the scanning circuit 3 whereby a voltage 55 provided with a wave form shown in FIG. 9 is generated from the stepwave voltage generator 5. The horizontal axis in FIG. 9 indicates the distance L between the probes 17 while the vertical axis indicates the voltage V available at the wire 53 respectively. In FIG. 9, $N_1, N_2, N_3, N_4, \ldots N_n$ represent the positions of the probes 17. The stepwave voltage generator 5 generates a voltage corresponding to the position of the probe 17 and the voltage thus generated is applied to the input terminal of the X axis of the construction means on the next step. In this embodiment, a stepwave voltage is used as the voltage corresponding to the position of each probe 17. However, the voltage 71 of the waveform shown in FIG. 14 increases linearly with respect to the distance L of horizontal axis can also be used. The voltage 71 of the waveform shown in FIG. 14 can be formed by the circuit shown in FIG. 13. The circuit in FIG. 13 generating the voltage corresponding to the position consists of slide resistance 75 and slider 77. In this circuit with a reference voltage applied to the slide resistance 75 through the terminal 73, waveform voltage 71 indicated in FIG. 14 can be obtained at the wire 79.

Particulars of the construction means 7, though not illustrated in drawings, are the X–Y recorder which has hitherto been well known. In this construction means, the voltage from the stepwave voltage generator is applied to the X axis input terminal while the voltage from the scanning circuit 3 is applied to the Y axis input terminal respectively.

The control circuit 9 comprises two kinds of circuits; one is a circuit which applies timing signal to the scanning circuit 3 and to the stepwave voltage generator 5, and the other is a circuit directing a vertical movement of pen in the construction means 7. In other words, the control circuit 9 is constituted to apply timing signals to the scanning circuit 3 and the stepwave voltage generator 5, and to rotate the travelling contacts 35, 39 of the scanning circuit 3 and the travelling contact 49 of the stepwave voltage generator 5 by these timing signals. Furthermore, the control circuit 9 generates control signals which enable vertical recording pen movement thereby permitting the recording pen to contact the recording paper when recording begins by the construction means and to separate from the recording paper when recording suspends.

This control circuit 9 is a circuit for overall control when constructing with the X–Y recorder.

Performance of the apparatus for constructing potential gradient having such a constitution as aforementioned is dealt with as follows. First of all, the potential detector 1 is put on the anacon-paper 11 having potential distribution. As the result, the probes 17 are pushed upward by the anacon-paper 11 and contact with the anacon-paper 11 with contact force of 6 – 7 g. Even if there existed unevenness on the surface of anacon-paper 11, if the unevenness was below about 1 mm, detection of voltage by the probes 17 can be done as the respective probes 17 are formed to engage in the vertical motion independently.

Figure 10:
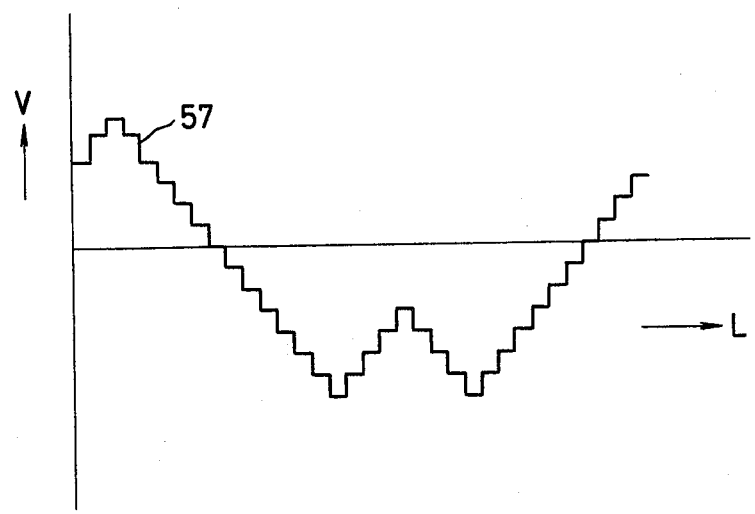
FIG. 10 shows an example of construction by way of apparatus for constructing potential gradient shown in FIG. 1.

Then, the timing signal from the control circuit 9 lets the travelling contacts 35, 39 of the scanning circuit 3 and the travelling contact 49 of the stepwave voltage generator 5 start rotating with synchronization. Then the voltage between the 1st and 2nd probes 17 is applied to the input terminal of the Y axis of the construction means 7 through the scanning circuit 3. While the voltage from the probes 17 is applied to a Y axis input terminal, the voltage equal to one travel step from the stepwave voltage generator 5 is added to the X axis input terminal of the construction means 7. In other words, the voltage of the difference between the voltage responding to the position of the 1st probe 17 and the voltage responding to the position of the 2nd probe 17 is is applied to the Y axis input terminal. Then, keeping the voltage applied to the input terminal of the X axis, the voltage between the 2nd probe 17 and the 3rd probe 17 is applied to the input terminal of the Y axis of the construction means 7 and this sort of operation goes on in order to obtain a construction 57 as shown in FIG. 10 is obtained. FIG. 10 is a construction in which the horizontal axis indicates a position or distance L while the vertical axis indicates voltage V respectively. This construction 57 was made in this way, i.e. at first the Y axis was constructed by the potential difference between the 1st probe 17 and the 2nd probe 17, then the X axis was constructed by the voltage responding to the space or distance between the 1st probe 17 and the 2nd probe 17 and this sort of operation was repeated.

Figure 11:
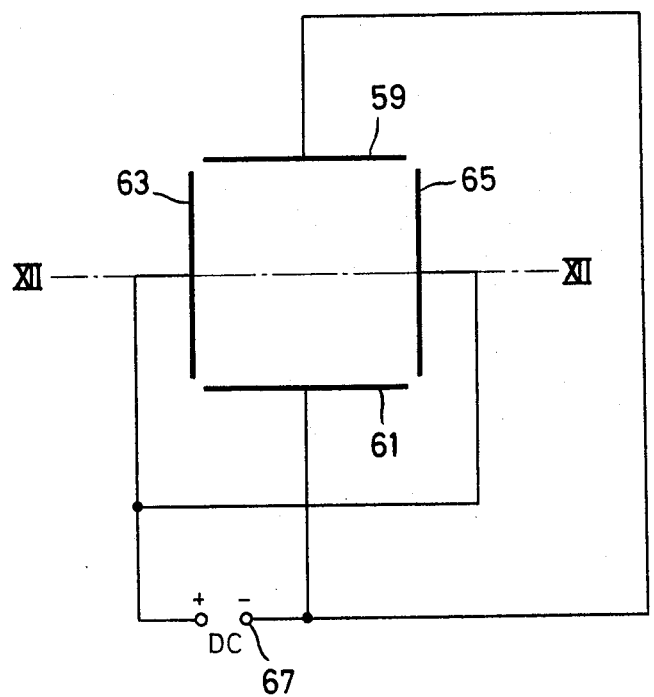
FIG. 11 is a circuit diagram of one embodiment showing the positions of electrodes on anacon-paper and the place of measurement in accordance with this invention.
Figure 12:
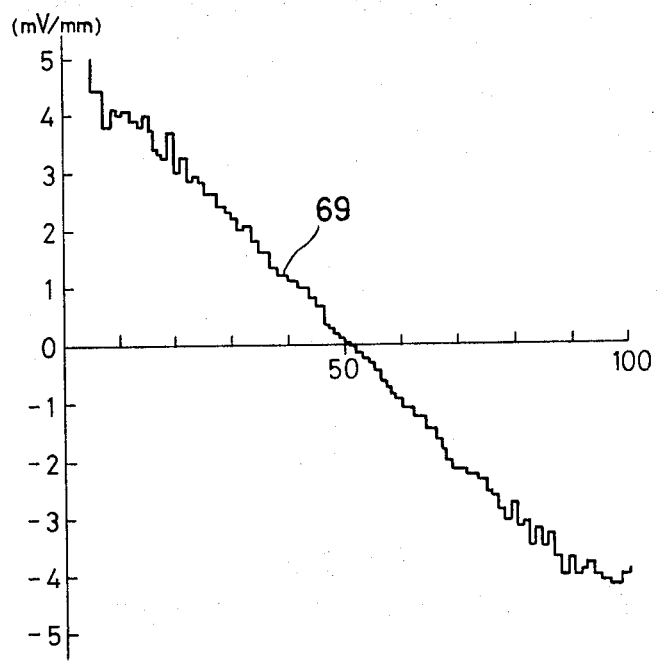
FIG. 12 shows a construction of a potential gradient on the line XII — XII of FIG. 11.

Next, an embodiment constructing potential gradient shown in FIGS. 11 and 12 will be dealt with. As shown in FIG. 11 four electrodes 59, 61, 63 and 65 of conductive paint form a square on the anacon-paper. The confronting electrodes are commonly connected respectively, these electrodes are connected with the terminal of direct-current power source and then by applying voltage of about 1 v to the electrodes the potential distribution was formed on the anacon-paper. By arranging the probes 17 on the XII—XII line in FIG. 11, the potential gradient was constructed as seen in the construction 69 in FIG. 12. This kind of construction can be made by computation & etc, but the operation itself was fairly troublesome. According to the apparatus for constructing potential gradient in accordance with this invention, however, the construction 69 as illustrated in FIG. 12 can be done within about one minute.

Although embodiments of this invention have been described in detail with reference to the accompanying drawings, it is to be understood that the invention is not limited to the details shown and described, and that various changes and modifications can be made.

What is claimed is:

1. Apparatus for constructing a potential gradient comprising:
   a potential detector comprising a plurality of voltage probes having predetermined positions;
   a scanning circuit comprising switching means connected with each of said voltage probes and means to selectively switch said switching means so as to obtain the voltage between a selected two of said voltage probes at the output of said switching means;
   a position indicating voltage generator synchronized with said scanning circuit so as to generate a position indicating voltage corresponding to each of the selected two of said voltage probes at the output of said switching means; and
   X–Y construction means comprising recording means capable of moving in the X axis direction and the Y axis direction in response to X axis and Y axis inputs respectively, said output of said scanning circuit being coupled to one of said inputs and said output of said position indicating voltage generator being coupled to the other of said inputs so to record the potential gradient of the potential distribution.

2. The apparatus according to claim 1 wherein said potential detector comprises a plurality of voltage probes resiliently contacting a surface having a potential distribution and means for maintaining said voltage probes in predetermined positions.

3. The apparatus according to claim 1 wherein said scanning circuit comprises fixed contacts connected with said respective voltage probes and travelling contacts successively engaging said fixed contacts.

4. The apparatus according to claim 1 wherein said position voltage generator comprises a stepwave voltage generator where each step of the voltage corresponds to the position of the selected two of said probes.

5. The apparatus according to claim 1 wherein said position indicating voltage generator comprises a circuit for generating a voltage that increases linearly corresponding to the position of the selected two of said probes.

* * * * *

UNITED STATES PATENT OFFICE
CERTIFICATE OF CORRECTION

Patent No. 3,761,807　　　　　　　　　Dated September 25, 1973

Inventor(s) Takao Kobayashi et al.

It is certified that error appears in the above-identified patent and that said Letters Patent are hereby corrected as shown below:

On the cover sheet, in the heading, insert

--[30] Foreign Application Priority Data:

Japan　　　　August 25, 1970　　　　73859/1970

Japan　　　　August 25, 1970　　　　84038/1970 --

Column 5, line 13, "the" first occurrence should read -- a --.

Signed and sealed this 25th day of June 1974.

(SEAL)
Attest:

EDWARD M. FLETCHER, JR.　　　　　　C. MARSHALL DANN
Attesting Officer　　　　　　　　　　Commissioner of Patents